Feb. 23, 1960     E. SAUER ET AL     2,925,764
SINGLE LENS REFLEX CAMERAS

Filed Sept. 10, 1954     4 Sheets-Sheet 3

Inventors
Edgar Sauer
Johann Hahn
Eugen Jörg
Ernst Rall by Singer, Stern & Carlburg,
Attorneys Feb. 23, 1960     E. SAUER ET AL     2,925,764
SINGLE LENS REFLEX CAMERAS Filed Sept. 10, 1954     4 Sheets-Sheet 4

Inventors
Edgar Sauer
Johann Hahn
Eugen Jörg
Ernst Rall
by Singer, Stern & Carlberg,
Attorneys

United States Patent Office 2,925,764
Patented Feb. 23, 1960

2,925,764
SINGLE LENS REFLEX CAMERAS

Edgar Sauer and Johann Hahn, Stuttgart, Eugen Jörg, Stuttgart-Degerloch, and Ernst Rall, Stuttgart, Germany, assignors to Zeiss Ikon A.G., Stuttgart, Stuttgart, Germany Application September 10, 1954, Serial No. 455,262

Claims priority, application Germany October 30, 1953

11 Claims. (Cl. 95—64)

The invention relates to single lens mirror reflex cameras provided with a central shutter and a diaphragm preselector device.

The primary object of the invention is to provide a photographic camera of the mentioned type in which the following operations are accomplished for bringing the camera in readiness for an exposure by simply actuating a single knob.

The film is advanced, the shutter is tensioned, shutter blades are opened, and the diaphragm is opened to its largest extent. Furthermore, the simultaneous changing of the mirror to view-finding position and the covering of the film during the focusing of the camera may also be effected by the same operating knob mentioned above, but these additional operations do not form an object of the present invention.

It is a further object of the invention to effect the closing of the shutter, the contraction of the diaphragm to the preselected opening and the release of the shutter—all in correct time and in proper sequence for exposing the film; the upward tilting of the mirror and film cover plate being also carried out but is not an object of the present invention.

Another object of the invention is to provide the possibility of B-exposure, namely, to cause the shutter diaphragm to remain open any desired length of time.

The above mentioned objects of the invention are achieved by the provision of a control ring which rotatably surrounds the central shutter and is provided with axially extending projections and which control ring effects the tensioning of the shutter and the other mentioned operations. Said control ring is provided with external gear teeth which by means of an intermediate gearing is connected to the film advancing knob. The novel arrangement of all control elements for shutter and diaphragm as mutually rigid parts of a common support, namely the control ring, particularly favors the timely sequence of the various motional operations when the camera is adjusted to a position of readiness as well as when the pictures themselves are taken. The sequence and starting time of the operations to be initiated can in accordance with the invention be accurately adjusted to the camera conditions by suitable mutual arrangement of the control elements. Of course, one and the same part of the control ring may take over several functions, for instance, the tensioning of the shutter and at the same time the opening of the shutter blades.

It is a further object of the invention to render the speed of rotation of the control ring responsive to adjusting influences. Thereby the advantage is gained to compensate for manufacturing tolerances or to allow greater tolerances, and to adjust the operation of the shutter elements to the actuation of the mirror and cover plate such that these parts are positively moved completely out of the path of light which are to expose the film when the cutter for film exposure starts to open up. It is also made possible to employ shutters in which the blades at the release of the shutter start to open not all at once but with some time-delay intervals differing from each other.

The present invention will now be described more fully with reference to the accompanying drawings illustrating, by way of example, preferred embodiments of the invention, in which drawings equal parts in all figures are provided with theh same reference letters, and in which.

Figures 1, 2:
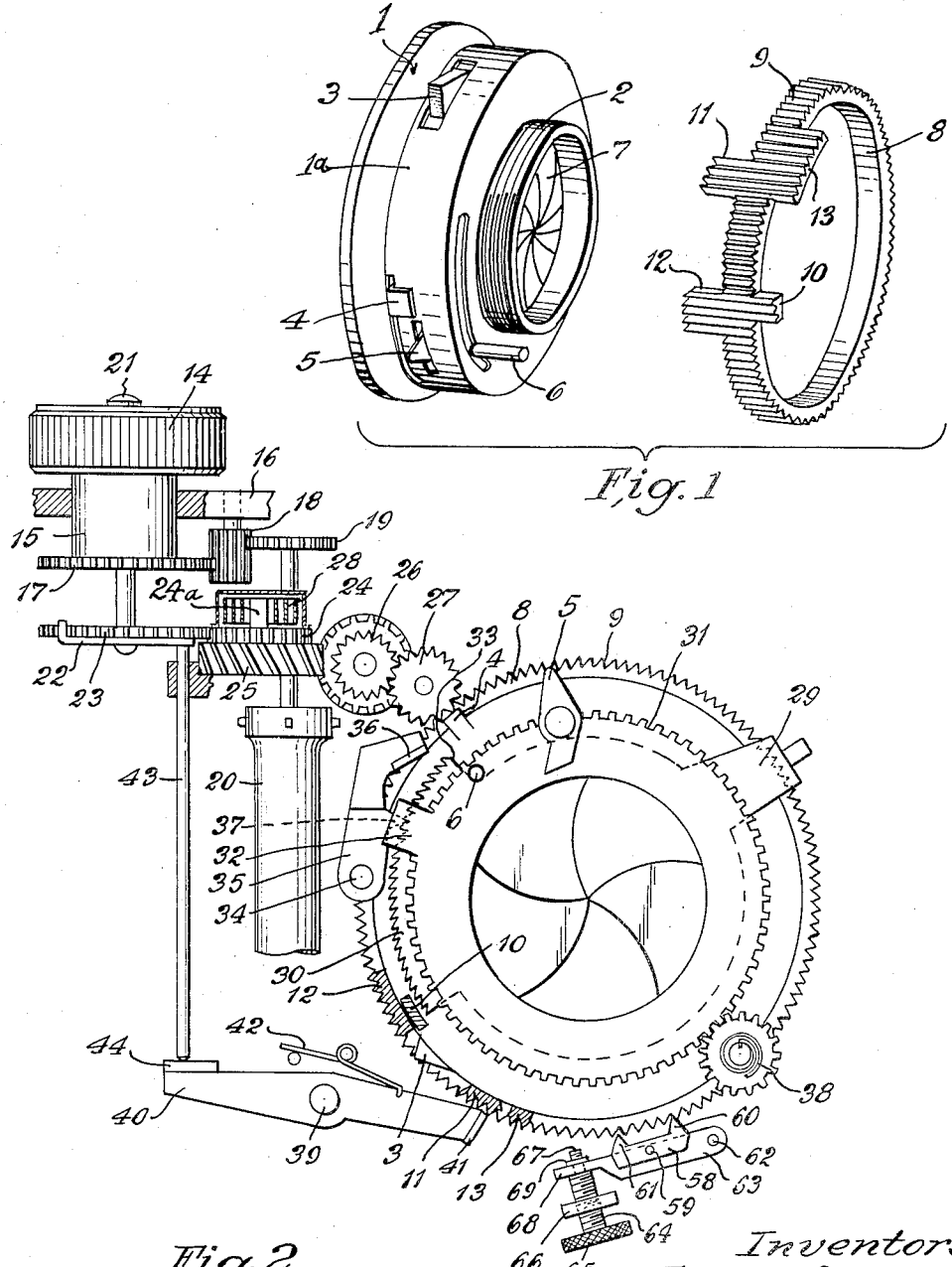
Fig. 1 is a perspective view of a shutter with the control ring removed.
Fig. 2 shows in diagrammatic form a front view of a released closed shutter and with a diaphragm whose segments have moved together to the preselected opening, and the driving parts of the shutter and of the film winding spool.

Referring to Fig. 1, a perspectively illustrated conventional shutter 1, which may be secured to a camera by means of a thread 2, is provided with a release lever 3, a tensioning lever 4 for winding the shutter and an opening lever 5 for the shutter blades. 6 is a stop pin by the adjustment of which the iris diaphragm 7 will be more or less opened and closed, respectively. The control ring 8, which is provided with external gear teeth 9, in addition with four control members 10, 11, 12 and 13 is to slidably mounted upon a cylindrical body portion 1a of the shutter 1.

In Fig. 2 are shown all the parts of the camera essential for an understanding of the present invention. A rotatable knob 14, whose shaft 15 passes through the camera wall 16 (shown in sectional view), is connected to the film winding spool 20 by gears 17, 18 and 19. A trigger 21, to the lower extremity of which a driving plate 22 is secured which engages a gear 23, is axially displaceably arranged within the rotatable knob 14 and rotates therewith. The gear 23 is in operative connection with the control ring 8 through gears 24 and 25, which are in axial alinement fixedly attached to each other and through the additional gears 26 and 27. The shaft 24a, on which the gears 24 and 25 are secured, is connected with a spiral spring 28. Coaxially to the control ring 8 there are further arranged: a diaphragm preselector ring 29 partically provided with external teeth 30, and a diaphragm opening ring 31 having a radial projection 32.

A holding latch 35 pivotally journalled at 34 and having a nose 36 and a retaining tooth 37 cooperates with the external teeth 30 of the diaphragm preselector ring 39 which is provided with a shoulder at 33. The diaphragm ring 31 is in geared connection with a spring housing 38. Furthermore, there is provided a two-armed lever 40 pivotally journalled at 39 which has a catching nose 41 and which by means of a spring 42 holds the control rod 43 in operative engagement on the one hand with its bent projection 44 and on the other hand with the driving plate 22.

Figure 3:
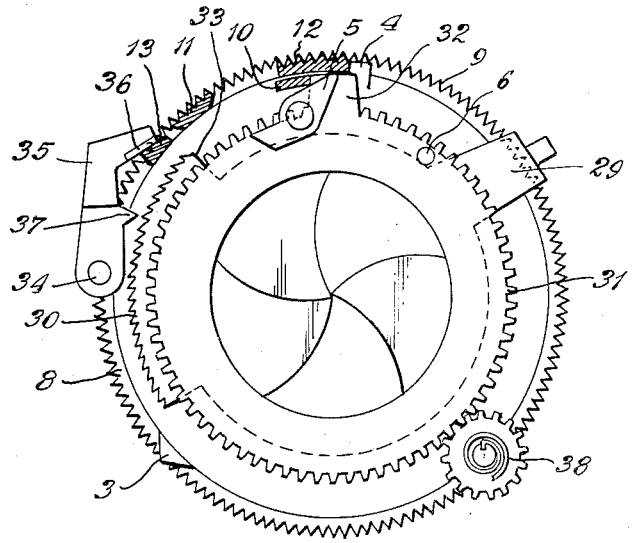
Fig. 3 shows the shutter in tensioned position with open shutter blades and open diaphragm.

The camera is changed from the released condition (Fig. 2) to the condition ready for taking a picture (Fig. 3) in the following manner:

By turning the knob 14, the film is advanced by the intermediary gearing 17, 18 and 19 which rotates the spool 20. At the same time, the control ring 8 is rotated about the body of the central shutter by means of the drive plate 22 and intermediary gears 23 to 27 in clockwise direction against the action of the spring 28 which is tensioned during this operation. In order to drive the ring 8, the cylindrical wall of said ring is provided with external teeth 9. Axially extending shoulders 10, 11, 12 and 13, which are formed on axial projections on the control ring 8 and may be disposed at one or at both sides of the body portion of the ring, control the shutter and diaphragm device during the rotation of the knob 14 in the following manner: The projection 12 travels toward the tensioning lever 4 of the shutter until it abuts against it and moves said lever along for tensioning the shutter. Prior to this, the projection 11 passes over the release lever 3 and temporarily presses the latter inwardly without any further action. During the tensioning of the shutter, the projection 12 also slides past the opening lever 5 for the shutter blades because the lever 5 protrudes into the path of the projection 12 and said lever is operated so that the shutter blades are completely opened. In addition, the projection 10 of the control ring 8, by engaging the projection 32 on the diaphragm opening ring 31, takes the latter along until at the end of the tensioning motion for the shutter the diaphragm is fully opened against the action of a spring contained in the spring housing 38. During the last portion of the movement of the ring 8 the projection 13 of said ring, by running against the nose 36 of the holding latch 35, will disengage the locking tooth 37 of said latch from the tooth segment 30 of the diaphragm preselector ring 29 and the latter, after completion of film advance and shutter tensioning, and with the camera ready for exposure, is free to move the diaphragm to the desired aperture chosen previously for the next exposure. The various parts now take a position as shown in Fig. 3. According to the adjustment of the preselector ring 29 to a larger or a smaller diaphragm aperture, the shoulder 33 of its tooth segment portion is spaced a smaller or greater angular distance away from the stop pin 6 of the diaphragm ring 31. In the meantime, the mirror, not shown in the drawing, has been brought in known manner in its operative or viewing position and a film cover diaphragm moves into film covering position, all by means of the rotatable knob 14 and a gearing, similar to the gear 23.

Figure 4:
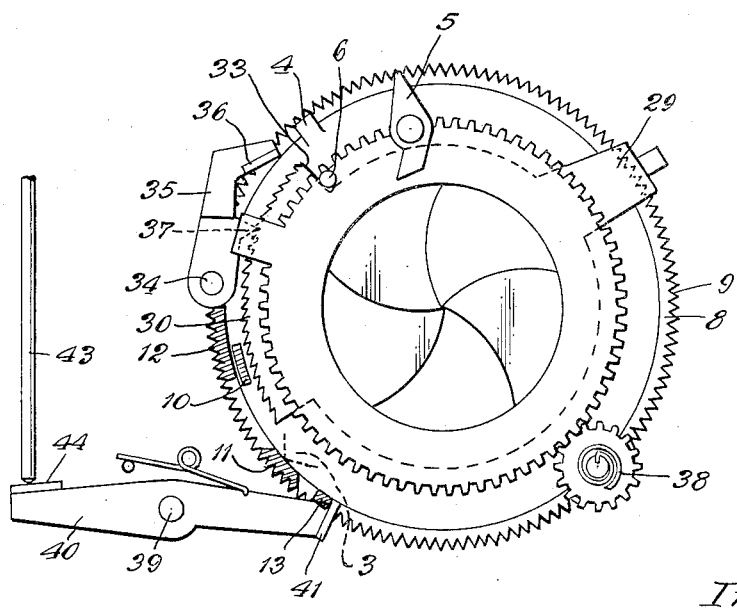
Fig. 4 is a view of the released shutter in B-position with engaged locking pawl.

The central release button 21 within the transport knob 14 is pressed when taking a picture. This actuation of the button moves the driving plate 22 downwardly and out of engagement with the gear 23 of the tensioning gear drive 23, 24, 25, 26, 27 and 8 so that the latter snaps back under the action of the spring 28. In doing so, the projection 13 of the returning control ring 8 first releases the holding latch 35 and then said latch locks the diaphragm preselector ring 29 in its selected position for the film exposure. Furthermore, the opening lever 5 for the shutter blades follows the backsliding motion of the ring projection 12 and the shutter blades close. The setting lever 4 of the shutter also is released by the projection 12 and it can return to its initial position. Moreover, the diaphragm ring 31 follows with its nose 32 the receding ring projection 10 until its pin 6 abuts against the shoulder 33 of the now locked preselector ring 29. Thereby the diaphragm is adjusted to the aperture preselected for exposure. In the meantime, the mirror has been released and the film cover diaphragm has been tilted upwardly into their horizontal position out of the path of rays of the exposure objective. During the continuous snapping-back of the control ring 8, the projection 11 of same moves over the release lever 3 of the shutter, presses it inwardly and the shutter starts to run down. If now the release button 21 is still pressed down, then the lever 40 under the influence of the control rod 43, displaced by the driving plate 22, is in a position wherein it catches the projection 13 of the control ring 8 with a nose 41 and prevents said projection from travelling beyond its position of inwardly pressing the shutter release lever 3. The purpose of stopping the ring 8 in the position according to Fig. 4 is that it is thereby possible to carry out a B-exposure. If the shutter is adjusted for B-exposure, then its blades remain open until the release button 21 is released and disengages the catch nose 41 from the ring projection 13. Thereafter, the control ring 8 returns to its initial position according to Fig. 1, the shutter blades close and the shutter release lever 3 projects into its position of rest.

Figure 5:
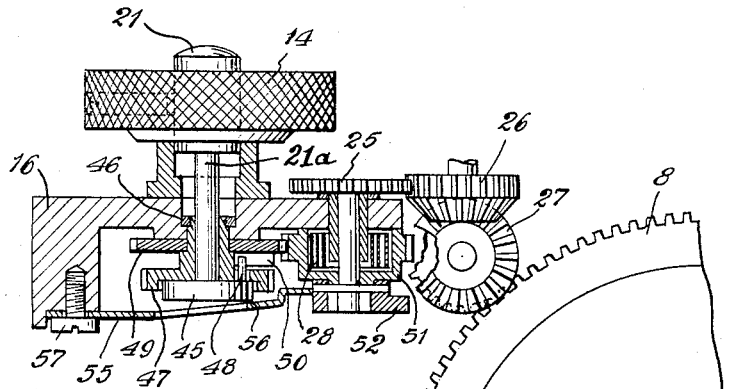
Fig. 5 shows in a diagrammatic view a frontal elevation of a particular formation of the locking pawl of the camera for B-position.
Figure 6:
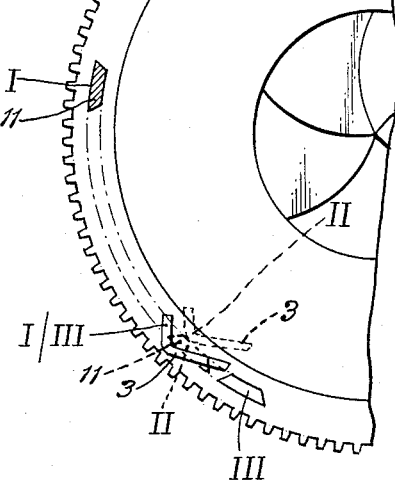
Fig. 6 is a top view of the locking pawl according to Fig. 5.
Figure 6:
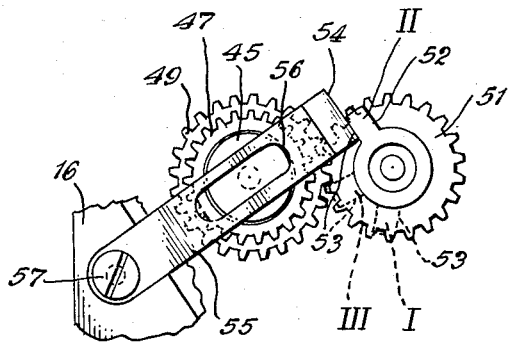
Figure 7:
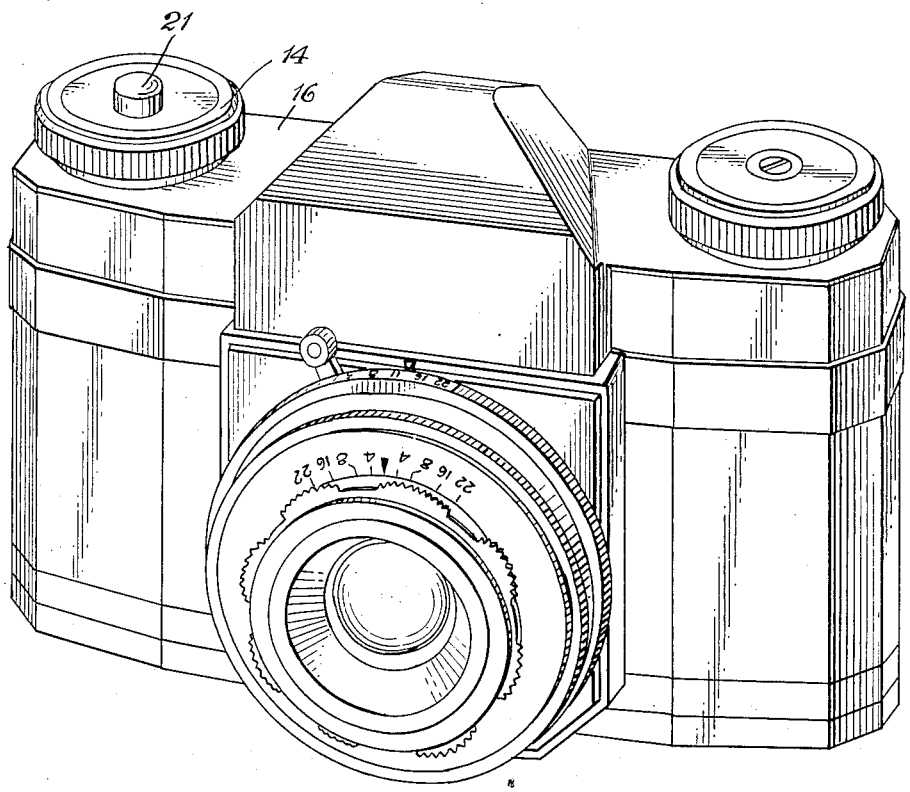
Fig. 7 is a view of the camera embodying the features of the present invention.

An alternative method of stopping the control ring 8 in the position for B-exposure is illustrated in Figs. 5 and 6 which show, partly in section, a diagrammatic view only of those parts most necessary for understanding another embodiment of the invention.

The trigger 21 which carries on its lower extremity a release plate 45 is again axially slidably mounted in the film advancing knob 14 and is secured against rotation. Mounted on the shaft 21a of the trigger 21 is a gear 47 provided with a hub and retained by a nut 46, by which gear the film transport is actuated. The release plate 45 is provided with a pin 48 which passes through a hole in the gear 47 so that in turning the knob 14 the gear is concurrently rotated and the film is advanced. Rotatably mounted on the hub of the gear 47 is a further gear 49 which has on its lower face a rib 50 against which the pin 48 is able to bear when the trigger 21 has not been pressed down. The gear 49 engages the external teeth provided on the spring casing 51 of the spring 28. The spring housing 51 is in engagement with the adjusting ring 8 by means of additional gears which correspond to the gears 25, 26 and 27 according to Fig. 2. Only the projection 11 is shown of the control members of said ring 8.

The spring housing 51 carries a rigid cam 52 which with its surface 53 is able to travel against the end face 54 of a leaf spring 55 (see Fig. 6). This leaf spring 55, which abuts against the edge 56 of the release plate 45, acts as reset spring for the trigger 21 and as well as a lock for the B-exposure in cooperation with the cam 52. Said spring is secured in a non-rotatable manner within a suitable groove of the camera casing 16 by means of a screw 57 and it abuts with its narrow edge against the wall of said groove so that the camera casing will absorb the impact of the spring and not the fastening screw 57, the diameter of which, as shown in Fig. 5, is smaller than the surrounding bore in the spring 55. The manner of operation is the following:

The knob 14 is turned in order to bring the camera in position of readiness after an exposure has been made. In doing this, the gear 47 by means of the pin 48 is concurrently rotated and the film will be advanced. At the same time, the pin 48 bears against the radial rib 50 on the gear 49 and thus also the gear 49 is rotated. Thereby the spring 28 is tensioned and the control ring 8 is adjusted by the intermediary gears 25, 26 and 27, and all other operations like setting of the shutter, opening of the diaphragm, etc. are initiated as described in the first example of the embodiment. At the end of the film advance, the projection 11 and the cam 52 occupy the position as designated with I in Figs. 5 and 6. If now for making an exposure, the trigger 21 is pressed against the resistance of the leaf spring 55, then the pin 48 will come out of the zone of the rib 50, and the gear 49 is released. The gearing 49, 51, 25, 26 and 27 is then set in motion by action of the spring 28 and thereby adjusts the control ring in anticlockwise direction. At the same time, the free end of the leaf spring 55 is moved into the path of the cam 52 so that the surface 53 thereof, after a corresponding rotation of the spring housing 51, hits against the end face 54 of the leaf spring 55 and arrests the motion of the spring housing (position II of the cam 52 in Fig. 6). Consequently the control ring is stopped, and its nose 11 releasing the shutter is situated above the release lever 3 and retains the latter in releasing position (II in Fig. 5). As long as the trigger 21 remains in pressed-down condition, the spring housing 51 will also stand still. It only continues to travel to its end position (position III of the cam 52 in Fig. 6) when camera trigger 21 is released so that it can move upwardly. The nose 11 of the control ring 8 releasing the shutter remains just as long at a standstill above the releasing member 3 of the shutter (position II in Fig. 5). When the camera is adjusted to B-position, then the shutter blades thus remain just as long in open position as the trigger 21 is pressed down, and these blades close again only when the control ring moves towards its end position (position III of the nose 11 on the control ring 8, Fig. 5).

Due to the fact that the releasing plate 45 adjusting the leaf spring 55 engages with its marginal portion 56 the locking extremity of the leaf spring, the power required for actuating the trigger 21 is very small. The leaf spring 55 is itself subjected to hardly any wear since the cam 52 hits against the front side of it in longitudinal direction of said spring.

As already mentioned, it may be desirable to make the traveling speed of the control ring 8 adjustable. For this purpose, a retarding device is provided as shown in Fig. 2. In the embodiment shown, this device comprises a double pawl 58 which is pivotally supported between its ends at 59 so that the teeth 60 and 61 at its opposite ends are adapted to alternately engage the external teeth 9 of the control ring 8. In order to make the release speed of this control ring 8 adjustable, the double pawl 58 is attached to a plate 63 pivotally supported at 62 to a part of the camera casing. This plate 63 is angularly moved by means of an adjustment screw 64 having a control knob 65, said screw 64 extends threadedly through a fixed part 66 of the camera casing. The non-threaded reduced end 67 of the screw 64 passes freely through a bore provided in the free end 68 of the plate 63. A spring washer 69 is holding the end 68 of the plate 63 in continuous engagement with the screw 64.

By adjusting the screw 64 from a center position, it is possible to make the teeth 60 and 61 of the double pawl 58 engage the teeth 9 of the control ring 8 more or less deep, whereby the traveling speed of the ring 8 is decreased or increased respectively.

What we claim is:

1. In a single lens mirror reflex camera a central shutter provided with a release lever, a tensioning lever, a shutter blade opening lever and an adjustable diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including gear means for operatively connecting said trigger shaft with said control ring, and means including a film winding spool operatively connected by other gear means with said manually rotatable knob, whereby upon rotation of the latter in one direction said control ring and said film winding spool are rotated simultaneously.

2. In a single lens mirror reflex camera a central shutter provided with a release lever, a tensioning lever, a shutter blade opening lever and an adjustable diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including gear means for operatively connecting said trigger shaft with said control ring, means including a film winding spool operatively connected by other gear means with said manually rotatable knob, whereby upon rotation of the latter in one direction said control ring and said film winding spool are rotated simultaneously, said trigger shaft when manually depressed causing said first mentioned gear means to be disconnected from said trigger shaft and thereby causing said control ring to rotate in said other direction after it has been rotated by said manually rotatable knob.

3. In a single lens mirror reflex camera a central shutter provided with a release lever, a tensioning lever, a shutter blade opening lever and an adjustable diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including gear means for operatively connecting said trigger shaft with said control ring, means including a film winding spool operatively connected by other gear means with said manually rotatable knob, whereby upon rotation of the latter in one direction said control ring and said film winding spool are rotated simultaneously, said trigger shaft when manually depressed causing said first mentioned gear means to be disconnected from said trigger shaft and thereby causing said control ring to rotate in said other direction after it has been rotated by said manually rotatable knob, said first mentioned gear means being operatively connected with a spring which is tensioned when said manually rotatable knob is rotated in said one direction, said spring assisting in the rotation of said control ring in said other direction when said trigger shaft is depressed.

4. In a single lens mirror reflex camera a central shutter provided with a release lever, a tensioning lever, a shutter blade opening lever and an adjustable diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including gear means for operatively connecting said trigger shaft with said control ring, means including a film winding spool operatively connected by other gear means with said manually rotatable knob, whereby upon rotation of the latter in one direction said control ring and said film winding spool are rotated simultaneously, said trigger shaft when manually depressed causing said first mentioned gear means to be disconnected from said trigger shaft and thereby causing said control ring to rotate in said other direction after it has been rotated by said manually rotatable knob, and means operatively connected with said manually depressible trigger shaft for arresting said control ring when it rotates in said other direction in a position in which said ring holds the shutter blades in an open position (B-exposure) until the trigger shaft is released.

5. In a single lens mirror reflex camera a central shutter provided with a release lever, a tensioning lever, a shutter blade opening lever and an adjusting diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including gear means for operatively connecting said trigger shaft with said control ring, means including a film winding spool operatively connected by other gear means with said manually rotatable knob, whereby upon rotation of the latter in one direction said control ring and said film winding spool are rotated simultaneously, said trigger shaft when manually depressed causing said first mentioned gear means to be disconnected from said trigger shaft and thereby causing said control ring to rotate in said other direction after it has been rotated by said manually rotatable knob, a shaft in said first mentioned gear means attached to a spring which is tensioned when said gear means is operated by said manually rotatable knob in said one direction, a cam fixedly secured to said shaft, a leaf spring fixedly secured at one end and engaged by said manually depressible trigger shaft, whereby the other end of said leaf spring is moved into the path of said cam when said depressible trigger shaft is depressed and causes said control ring to be arrested during its rotation in said other direction at a point in which the shutter blades are open (B-exposure) until said depressed trigger shaft is released.

6. In a single lens mirror reflex camera a central shutter provided with a release lever, a tensioning lever, a shutter blade opening lever and an adjusting diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said trigger knob causing said control ring to rotate in the other direction, thereby causing said diaphragm to be adjusted to the preselected size and said shutter release lever to be operated, and, including gear means for operatively connecting said trigger shaft with said control ring, means including a film winding spool operatively connected by other gear means with said manually rotatable knob, whereby upon rotation of the latter in one direction said control ring and said film winding spool are rotated simultaneously, said trigger shaft when manually depressed causing said first mentioned gear means to be disconnected from said trigger shaft and thereby causing said control ring to rotate in said other direction after it has been rotated by said manually rotatable knob, said first mentioned gear means being operatively connected with a spring which is tensioned when said manually rotatable knob is rotated in said one direction, said spring assisting in the rotation of said control ring in said other direction when said trigger shaft is depressed, and means operatively engaging said control ring for controlling the speed of its rotation in said other direction.

7. In a single lens mirror reflex camera a central shutter provided with a release lever, a tensioning lever, a shutter blade opening lever and an adjustable diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including gear means for operatively connecting said trigger shaft with said control ring, means including a film winding spool operatively connected by other gear means with said manually rotatable knob, whereby upon rotation of the latter in one direction said control ring and said film winding spool are rotated simultaneously, said trigger shaft when manually depressed causing said first mentioned gear means to be disconnected from said trigger shaft and thereby causing said control ring to rotate in said other direction after it has been rotated by said manually rotatable knob, said first mentioned gear means being operatively connected with a spring which is tensioned when said manually rotatable knob is rotated in said one direction, said spring assisting in the rotation of said control ring in said other direction when said trigger shaft is depressed, and a retarding device operatively engaging said control ring to reduce the speed of its rotation in said other direction, said retarding device including means for adjusting its retarding action and thereby the degree of speed reduction imposed upon said control ring.

8. In a single lens reflex camera, a photographic lens, a central shutter having a cylindrical body portion, a release lever, a tensioning lever and a shutter blade opening lever, all of which extending with a portion outwardly from the circumference of said cylindrical body portion, an adjustable diaphragm in said shutter, a diaphragm adjusting device including a diaphragm opening ring and a diaphragm preselecting ring, both arranged coaxially to said cylindrical body portion, and a single control ring mounted rotatably about the optical axis of said photographic lens on the cylindrical body portion of said shutter, said control ring being provided with a plurality of axial projections, one for operating said tensioning lever, and said shutter blade opening lever, and a second one for operating said diaphragm opening ring when the control ring is rotated in one direction, manually operable means for causing said control ring to be rotated in said one direction, spring means operatively connected with said manually operable means and tensioned when the same is operated to rotate said control ring, and a second manually operable means for causing said control ring to rotate under the action of said tensioned spring means in the other direction after the control ring has been rotated in said one direction, said control ring when rotating in said other direction causing said diaphragm to be locked by a third one of its axial projections to the preselected aperture, while the first one of said axial projections operates said shutter blade lever so that the shutter blades close, whereupon a fourth axial projection of the control ring actuates the shutter release lever to effect an exposure of the film in the camera.

9. In a single lens mirror reflex camera a central shutter provided with a release lever, a tensioning lever, a shutter blade opening lever and an adjustable diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including a gear train for operatively connecting said trigger shaft with gear teeth on said control ring, means including a film winding spool operatively connected by another gear train with said manually rotatable knob, whereby upon rotation of the latter in one direction said control ring and said film winding spool are rotated simultaneously, said trigger shaft when manually depressed causing said first mentioned gear train to be disconnected from said trigger shaft member and thereby causing said control ring to rotate in said other direction after it has been rotated by said manually rotatable knob.

10. In a single lens mirror reflex camera a central shutter provided with a release lever, a tensioning lever, a shutter blade opening lever and an adjustable diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever, said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including a gear train operatively connecting said trigger shaft with said control ring, means including a film winding spool operatively connected by another gear train with said manually rotatable knob, whereby upon rotation of the latter in one direction said control ring and said film winding spool are rotated simultaneously, said trigger shaft when manually depressed causing said first mentioned gear train to be disconnected from said trigger shaft and thereby causing said control ring to rotate in said other direction after it has been rotated by said trigger shaft when the latter was rotated by said manually rotatable knob, and a pivotally mounted pawl operatively connected with said trigger shaft for engaging an arresting said control ring when it rotates in said other direction in a position in which said ring holds the shutter blades in an open position (B-exposure) until the depressed trigger shaft is released.

11. In a single lense mirror reflex camera a central shutter provided with a release lever, a tensioning lever, a shutter blade opening lever and an adjustable diaphragm, a diaphragm adjusting device for adjusting the diaphragm opening to a preselected size, and a single control ring mounted rotatably about the optical axis of said photographic lens on said central shutter, said control ring being provided with a plurality of axial projections for operating said tensioning lever said shutter blade opening lever and said diaphragm adjusting device when the control ring is rotated in one direction, one of said plurality of axial projections actuating said release lever when the control ring is rotated in the other direction, manually operable means including a manually rotatable knob for causing said control ring to be rotated in said one direction, a second manually operable means including a trigger shaft extending slidably through said manually rotatable knob but rotatable therewith, said trigger shaft when slidably moved after rotation of said knob causing said control ring to rotate in the other direction, thereby causing said diaphragm to be adjusted to the preselected size and said shutter release lever to be operated, and, including a gear train operatively connecting said trigger shaft with said control ring, means including a film winding spool operatively connected by another gear train with said manually rotatable knob, whereby upon rotation of the latter in one direction said control ring and said film winding spool are rotated simultaneously, said trigger shaft when manually depressed causing said first mentioned gear train to be disconnected from said trigger shaft and thereby causing said control ring to rotate in said other direction after it has been rotated by a rotation of said manually rotatable knob, a shaft in said first mentioned gear train being attached to a spring which is tensioned when said gear train is operated by said rotation of said manually rotatable knob in said one direction, a cam with radial abutment face fixedly secured to said shaft, a leaf spring adapted to be flexed by said manually depressible trigger shaft, whereby one end of said leaf spring is moved into the path of said cam and engaged by its abutment face when said depressible trigger shaft is depressed and causes said control ring to be arrested during its rotation in said other direction at a point in which the shutter blades are open (B-exposure) until said depressed trigger shaft is released.

References Cited in the file of this patent

UNITED STATES PATENTS

| | | |
|---|---|---|
| 2,104,094 | Nerwin | Jan. 4, 1938 |
| 2,356,880 | Pignone | Aug. 29, 1944 |
| 2,380,610 | Pignone | July 31, 1945 |
| 2,503,777 | Stoiber | Apr. 11, 1950 |
| 2,552,275 | Harvey | May 8, 1951 |